(12) United States Patent
Lindemann

(10) Patent No.: US 8,700,473 B1
(45) Date of Patent: Apr. 15, 2014

(54) VEHICLE REGISTRATION DISPENSING SYSTEM

(76) Inventor: Brian Lindemann, St. Michael, MN (US)

( * ) Notice: Subject to any disclaimer, the term of this patent is extended or adjusted under 35 U.S.C. 154(b) by 115 days.

(21) Appl. No.: 13/160,151

(22) Filed: Jun. 14, 2011

Related U.S. Application Data

(60) Provisional application No. 61/354,430, filed on Jun. 14, 2010.

(51) Int. Cl.
*G06Q 20/20* (2012.01)

(52) U.S. Cl.
USPC ............ 705/24; 705/16; 705/75; 705/37; 705/408; 705/51; 235/381; 700/232; 709/229; 364/479

(58) Field of Classification Search
USPC ....... 705/24, 16; 235/381; 700/232; 380/282; 340/928
See application file for complete search history.

(56) References Cited

U.S. PATENT DOCUMENTS

| | | | | |
|---|---|---|---|---|
| 4,970,655 A | * | 11/1990 | Winn et al. | 700/235 |
| 5,349,534 A | * | 9/1994 | Rousseff et al. | 700/235 |
| 5,459,304 A | * | 10/1995 | Eisenmann | 235/380 |
| 5,559,885 A | * | 9/1996 | Drexler et al. | 235/380 |
| 7,330,719 B2 | * | 2/2008 | Foucher | 455/420 |
| 7,347,368 B1 | * | 3/2008 | Gravelle et al. | 235/384 |
| 2005/0240770 A1 | * | 10/2005 | Lane et al. | 713/176 |
| 2006/0064345 A1 | * | 3/2006 | Biet | 705/13 |
| 2010/0332363 A1 | * | 12/2010 | Duddle et al. | 705/34 |
| 2011/0035049 A1 | * | 2/2011 | Barrett | 700/232 |
| 2011/0046778 A1 | * | 2/2011 | Pinney et al. | 700/236 |

* cited by examiner

*Primary Examiner* — Vanel Frenel
(74) *Attorney, Agent, or Firm* — Dicke, Billig & Czaja, PLLC

(57) ABSTRACT

A method of dispensing registration that includes entering identifying information in an input module on a registration dispensing system. The identifying information is associated obtaining a registration. At least item is displayed on a display module associated with the registration dispensing system for which the registration may be obtained using the registration dispensing system. Registration payment information for the registration is received into the input module. The identifying information and the registration payment information are communicated with a database maintained by or on behalf of an entity issuing the registration. Registration information is received from the database. The registration information is formatted. The formatted registration information is printed on a registration document. The registration document is dispensed.

15 Claims, 12 Drawing Sheets

VEHICLE REGISTRATION DISPENSING SYSTEM

REFERENCE TO RELATED APPLICATION

This application claims priority to U.S. Provisional Application No. 61/354,430, which was filed on Jun. 14, 2010, the contents of which are incorporated herein by reference.

FIELD OF THE INVENTION

The invention generally relates to vending machines. More particularly, the invention relates to registration dispensing systems.

BACKGROUND OF THE INVENTION

It is customary for states to require vehicles to be registered and/or licensed before the vehicles are permitted to be operated on roads that are under the control of the state. The licenses are typically embodied in license plates that are affixed to at least one surface on an exterior of the vehicle. For example, the license plates may be attached to at least one of the front and rear bumpers of the vehicle.

The license plates are typically valid for a limited duration such as one year. For the vehicle to continue to be legally operated on the roads controlled by the state, the license plates need to be periodically renewed. Rather than replacing the entire license plates, many states have adopted procedures that utilize a sticker that is applied to the license plate to show that the registration fees have been paid. For example, the stickers may include a two digit number that corresponds to the last two digits of the year in which the registration is valid.

To ensure that the registrations are only obtained after the appropriate registration fee is paid, it is customary for each state to have an agency or department that issues the vehicle registration.

Even though some states have proposed eliminating the requirement of placing a sticker on the license plate each year to show that the license fees have been paid, these states would likely continue to require the annual payment of the license fees and the possession of a valid vehicle certificate of registration.

In an effort to reduce the cost associated with dispensing vehicle registration documents, it has been proposed to dispense the vehicle registration documents using a vending machine. Several vehicle registration dispensing systems have been developed by IBM, JCM America and Wal-Mart. These systems each have significant drawbacks when compared to the vehicle registration dispensing system of the invention described herein.

SUMMARY OF THE INVENTION

An embodiment of the invention is directed to an automated registration dispensing system. The system accepts input to confirm identification of vehicle, processes payment and then dispenses vehicle registration documents.

Another embodiment of the invention is directed to a method of dispensing registration. The method includes entering identifying information in an input module on a registration dispensing system. The identifying information is associated obtaining a registration. At least item is displayed on a display module associated with the registration dispensing system for which the registration may be obtained using the registration dispensing system.

Registration payment information for the registration is received into the input module. The identifying information and the registration payment information are communicated with a database maintained by or on behalf of an entity issuing the registration. Registration information is received from the database. The registration information is formatted. The formatted registration information is printed on a registration document. The registration document is dispensed.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated as they become better understood by reference to the following detailed description. The elements of the drawings are not necessarily to scale relative to each other. Like reference numerals designate corresponding similar parts.

DETAILED DESCRIPTION OF THE PREFERRED EMBODIMENTS

An embodiment of the invention is directed to a self-service system for dispensing registration documents. The registration dispensing system may be implemented in the form of a kiosk that includes a point of sale interface.

The registration dispensing system that may accept payments and may process applications and/or renewals of various annual motor vehicle stickers, tabs, tags, miscellaneous documents and registrations. The registration dispensing system interfaces and may electronically transfer the tax payment directly or indirectly to state's Department of Revenue in the process of collecting state taxes and/or fees.

For certain embodiments, the preceding registrations may be processed directly through the associated state. In other embodiments, the preceding registrations may be processed using a third party vendor that is utilized by the state.

While a primary intended use of the registration dispensing system described herein is for registrations that are issued by a state or other governmental entity, it is possible for the registration dispensing system to be used in conjunction with dispensing registration materials that are generated by non-governmental organizations.

Figure 2:
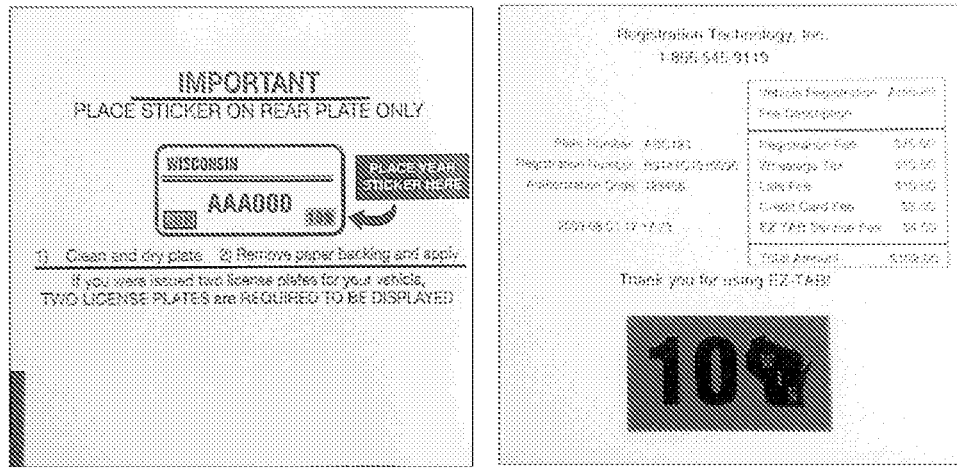
FIG. 2 includes front and back sides of a vehicle registration document obtained from the registration dispensing system.

Examples of registration and or other materials and services that may be performed and/or dispensed using the registration dispensing system include license plates, motor vehicle registrations, driver's licenses, driving records, identification cards, voter registration, marriage license, Amber Alerts, parole check-ins, hunting licenses, fishing licenses, boat registrations, trailer registration, social service registrations, birth certificates, death certificates, health and welfare services, business licenses and changes of address relating to one or more of the preceding registrations. An example of a registration document that may be dispensed using the registration dispensing system is illustrated in FIG. 2.

The registration dispensing system may also be used in conjunction with non-governmental tasks. Examples of such non-governmental tasks include dispensing gift cards, dispensing coupons and conducting surveys.

In certain embodiments, the registration dispensing system is used in conjunction with dispensing at least two groups of products and services. A first group of the products and services may be required, important or non-discretionary products or services such as dispensing license plates or welfare services. A second group of the products and services may be discretionary products and services such as fishing or hunting licenses.

To provide sufficient funds to cover the development, installation, operation and/or maintenance of the registration dispensing system, a first service fee may be charged when the registration dispensing system is used for the second group of products or services.

The first service fees may be sufficiently large to not only cover the costs allocated to using the registration dispensing system for the second group of products or services but also to cover at least a portion of the costs associated with using the registration dispensing system for the first group of non-discretionary products or services.

Such a configuration could enable the registration dispensing system to be used in conjunction with the first group of products or services with a reduced service fee or no service fee. The registration dispensing system could thereby minimize the fiscal burden of the first group of products or services to persons where the costs of the first group of products or services could be a greater portion of such person's fiscal resources.

Another option for the registration dispensing system is for the governmental entity that will be primarily using the registration dispensing system to not be billed for the development, installation, operation and/or maintenance of the registration dispensing system and for such costs to be paid by a service fee that is charged to the persons who are using the registration dispensing system.

Figure 20:
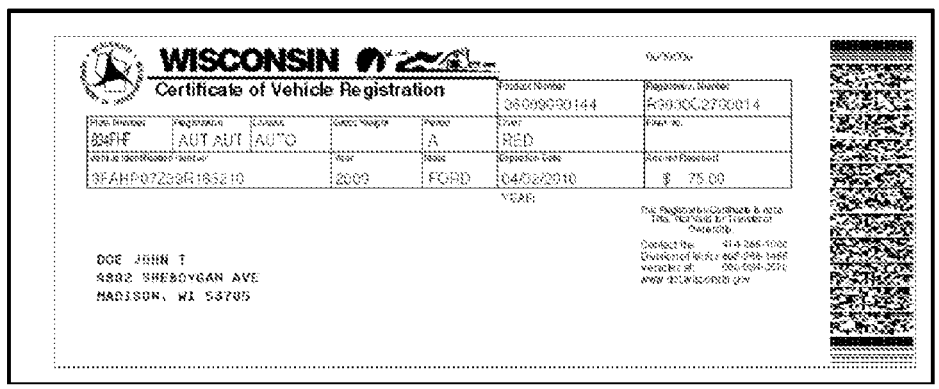
FIG. 20 is a certificate of registration generated using a conventional system.

Another aspect of the invention relates to converting data received from the state into a format that may be used in conjunction with the registration dispensing system. For example, when a document such as a certificate of registration is generated by the state vehicle registration agency, it may be formatted for printing on traditional equipment utilized in an office such as a laser printer utilizing a standard size paper such as about 8½ inches by about 11 inches. An example of a certificate of registration generated by a registration agency is set forth in FIG. 20. This document represents only the top portion of the piece of paper on which the certificate of registration data is printed.

The registration dispensing system may include a printing device that is mounted therein to facilitate generating documents such as a certificate of registration after the registration process is completed. One such printer that may be used in the registration dispensing system is a thermal printer, as the thermal printer does not require the use of consumable supplies other than paper and the thermal printers operate in a very reliable manner.

Figure 21:
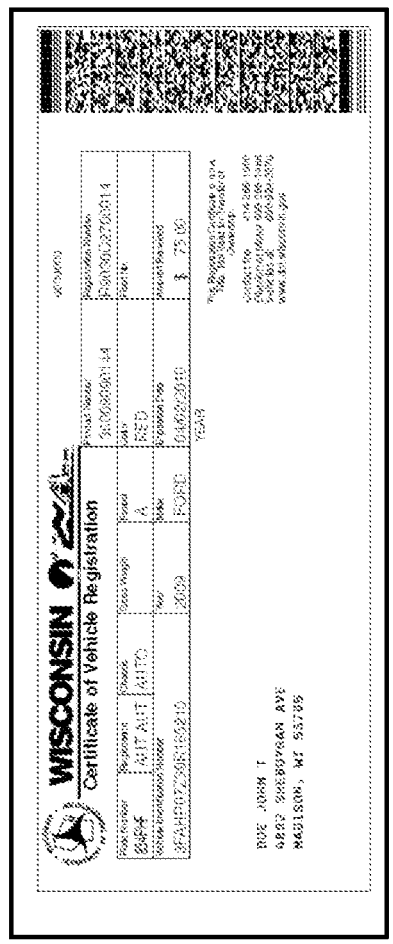
FIG. 21 is a certificate of registration generated using the registration dispensing system.

Utilizing the printer in the registration dispensing system to generate the certificate of registration may require changes to the format of the certificate of registration utilized. For example, it may be necessary to change the format, the file type and physical size of the certificate of registration to facilitate printing the certificate of registration on the printing system located in the registration dispensing system. An example of a certificate of registration generated by a printing device within the registration dispensing system is set forth in FIG. 21.

Figure 1:
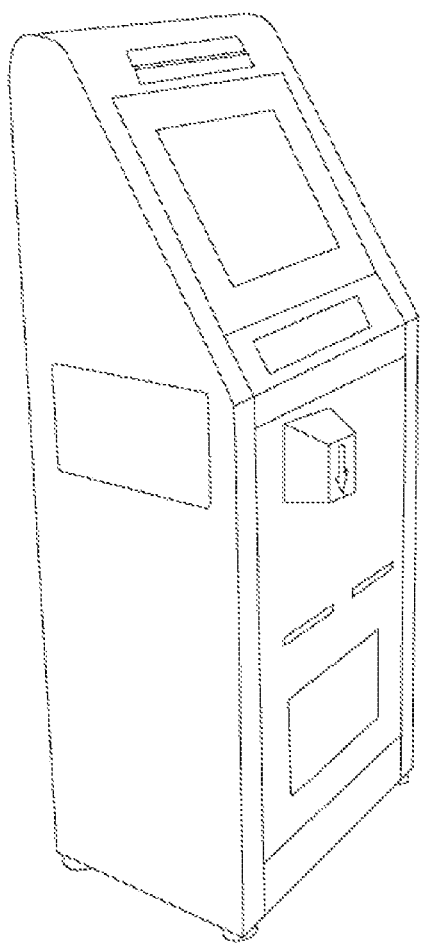
FIG. 1 is a perspective view of a registration dispensing system according to an embodiment of the invention.

In an embodiment, a person desiring to use the registration dispensing system that may be located so that it is convenient for the person to access the registration dispensing system. An example of a configuration for the registration dispensing system is illustrated in FIG. 1. Examples of possible locations for the registration dispensing system include big box retailers, grocery stores, convenience stores, gas stations, shopping malls and financial institutions.

Figure 3:
FIG. 3 is an initial screen from the registration dispensing process.

The registration dispensing system may include a display such as is illustrated in FIG. 3, which encourages the person to utilize the registration dispensing system and provides a mechanism for the person to start the registration dispensing process such as by touching a start button on the display.

Figure 4:
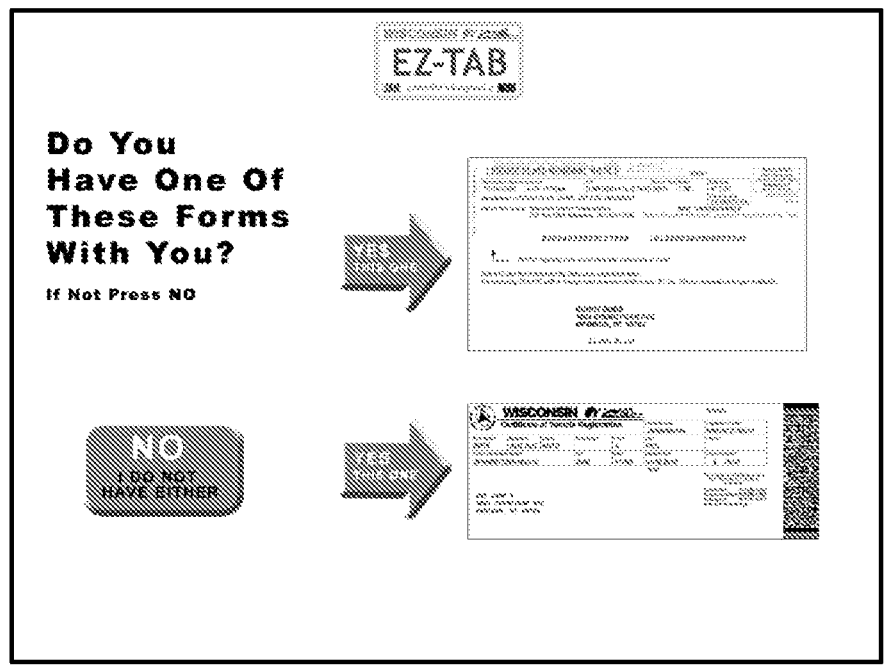
FIG. 4 is a main menu screen from the registration dispensing process.

To enhance the flexibility of the person's ability to use the vehicle registration system having a range of starting materials, the registration dispensing system may include the ability for the person to begin the process using a variety of types of documentation such as a registration renewal notice, a certificate of vehicle registration and a non-form option, as illustrated in FIG. 4.

Figure 5:
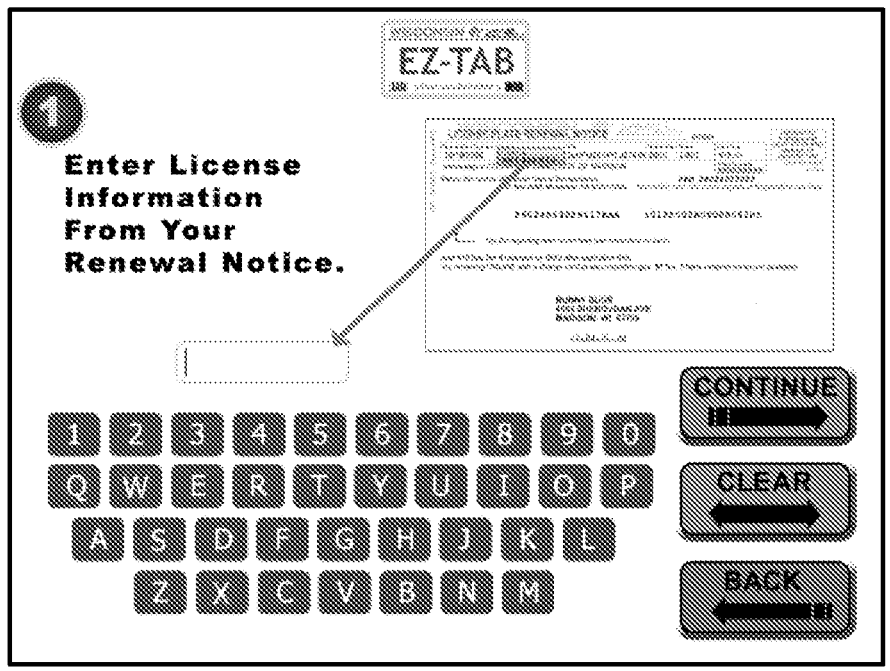
FIG. 5 is a first screen from the registration dispensing process when selecting the registration renewal notice option.
Figure 6:
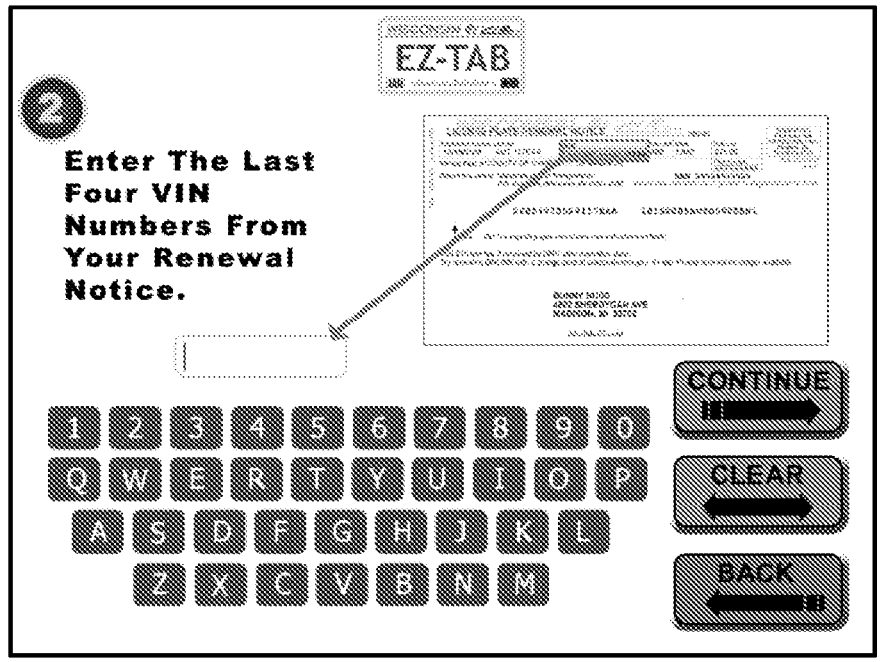
FIG. 6 is a second screen from the registration renewal notice option.

To ensure that the person is obtaining registration documents for the correct vehicle, the person may be required to enter additional identifying information for the vehicle, as illustrated in FIGS. 5 and 6. An example of the additional vehicle identifying information is a portion of the vehicle identification number such as the last four digits. Another example of the additional vehicle identifying information is the license plate number and plate type.

Figure 7:
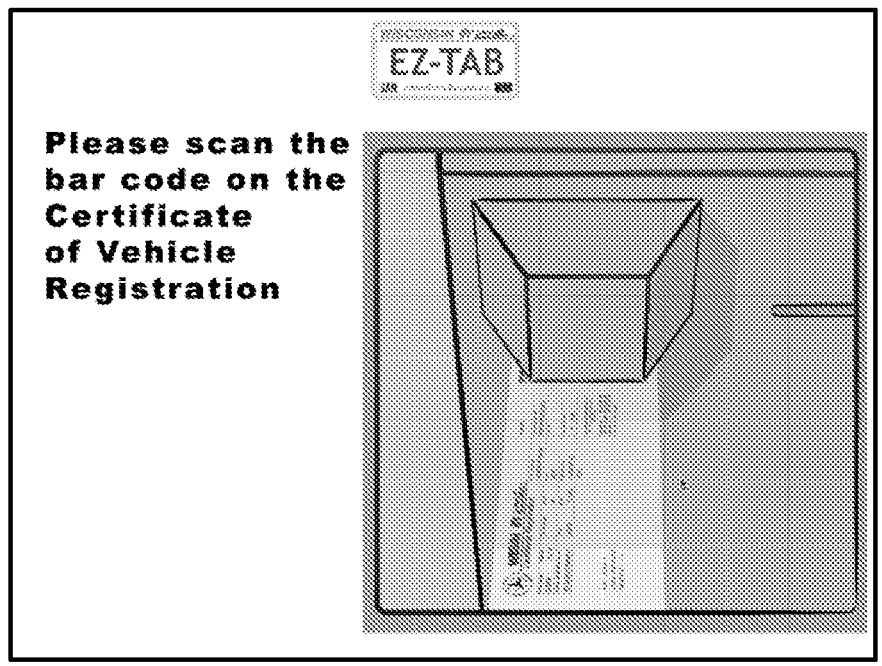
FIG. 7 is a first screen from the vehicle registration dispensing process when selecting the certificate of vehicle registration option.
Figure 8:
FIG. 8 is a first screen from the vehicle registration dispensing process when selecting the no form option.
Figure 9:
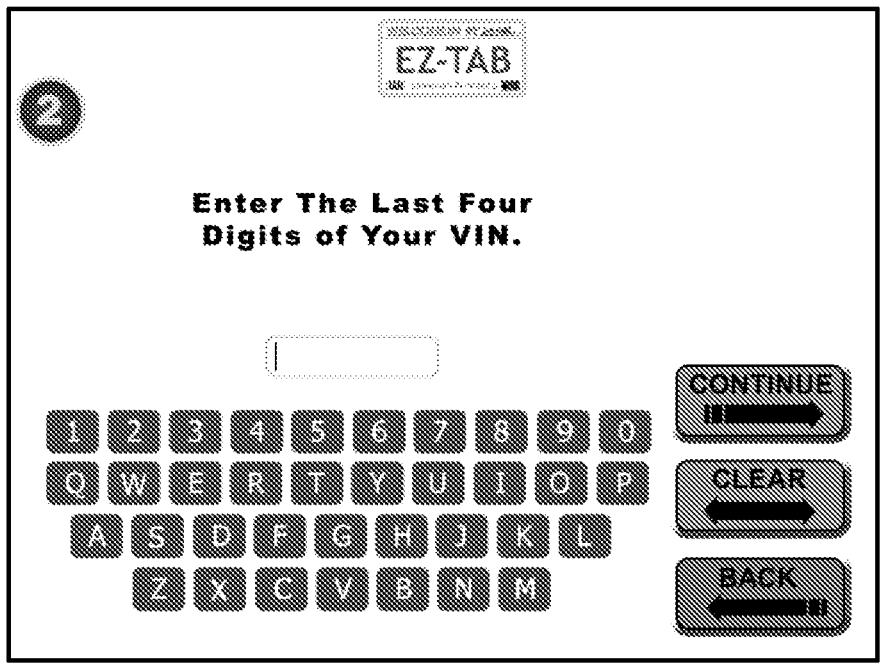
FIG. 9 is a second screen from the no form option.

Additionally or alternatively, the person may use a scanner that is associated with the registration dispensing system, such as is illustrated in FIG. 7. The scanner may read a bar code or other information on the certificate of vehicle registration or the license renewal notice.

The registration renewal system may also include a biometric scanner that scans a portion of a person's body such as fingerprints or retina to confirm the identity of the person obtaining the registration. The registration renewal system may also include an input device on which the person signs his or her signature.

To discourage misuse of the registration dispensing system and pursue persons who misuse the registration dispensing system, it is possible for the registration dispensing system to include the ability to record audio and video associated with the use of the registration dispensing system. This data may be stored locally in the registration dispensing system or may be transmitted to a remote location such as the database of the company operating the registration dispensing system.

Figure 10:
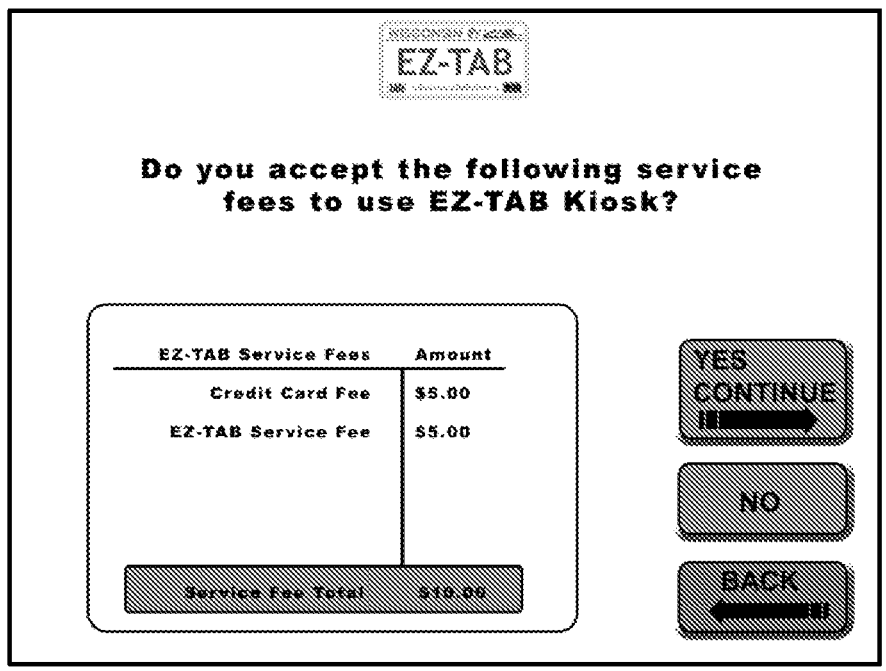
FIG. 10 is a service fee approval screen.

In certain situations, there may be an additional fee associated with using the registration dispensing system. Examples of such additional fees include a credit card processing fee and/or a fee that is paid to the owner or operator of the registration dispensing system. The registration dispensing system may include a screen that invites the user to approve the payment of the additional fee before the registration materials are dispensed, as illustrated in FIG. 10. If the person does not approve the payment of the additional fee, the registration dispensing system may display a notice that the registration cannot be dispensed without the payment of the additional fee and then terminate the transaction. The registration dispensing system may also display other options for the registrations to be obtained.

Figure 11:
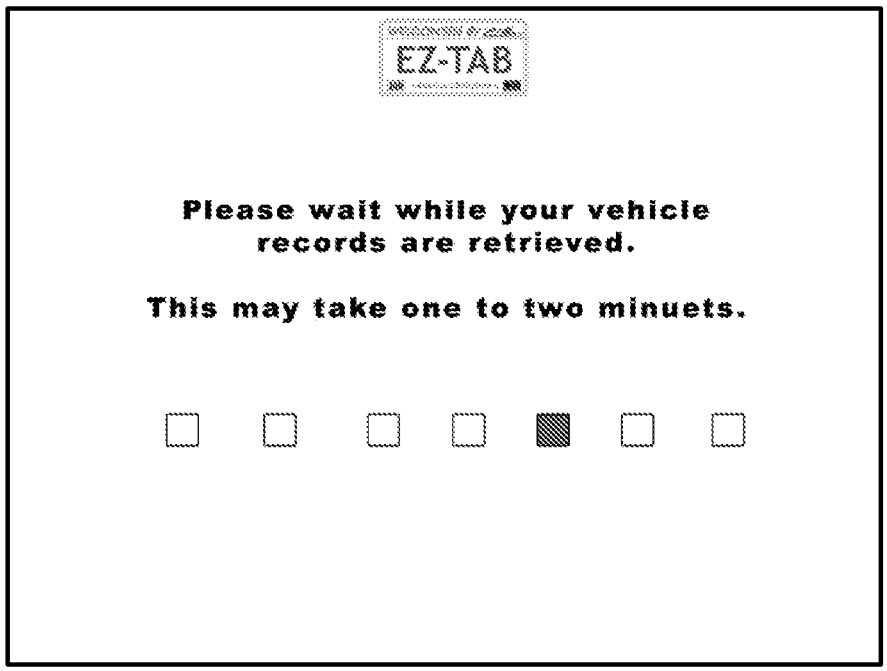
FIG. 11 is a first processing screen.

Depending on the amount of time for the registration dispensing system to obtain information needed to dispense the registration, the registration dispensing system may display a screen indicating that information is being retrieved, as illustrated in FIG. 11.

Figure 12:
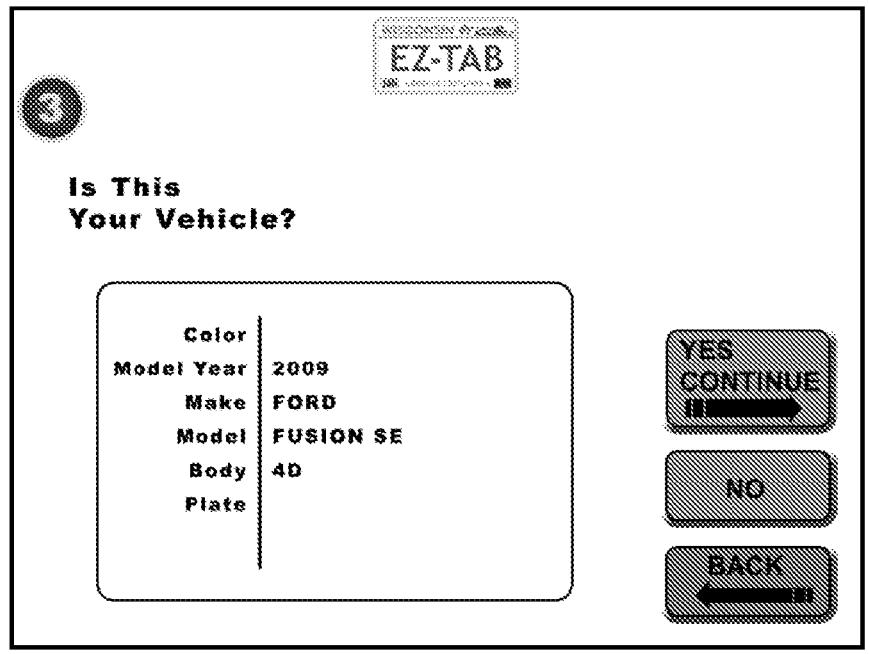
FIG. 12 is a vehicle detail confirmation screen.

Based upon the information that is entered into the registration dispensing system, the particular information relating to the registration that is desired to be obtained may be displayed on the screen as illustrated in FIG. 12. This display thereby enables the person to confirm that accuracy of the information before proceeding with the registration dispensing process.

Figure 13:
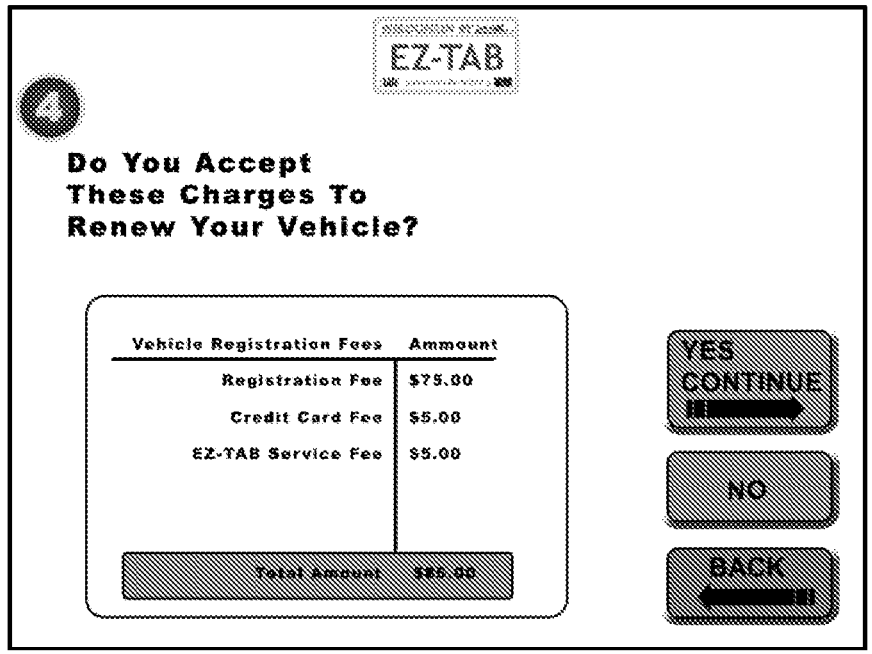
FIG. 13 is a total fee approval screen.

Next, the registration dispensing system may display the total amount of the payment needed to complete the registration process, as illustrated in FIG. 13. This total amount may include the registration fee as well as any additional fees such as are discussed above.

Figure 14:
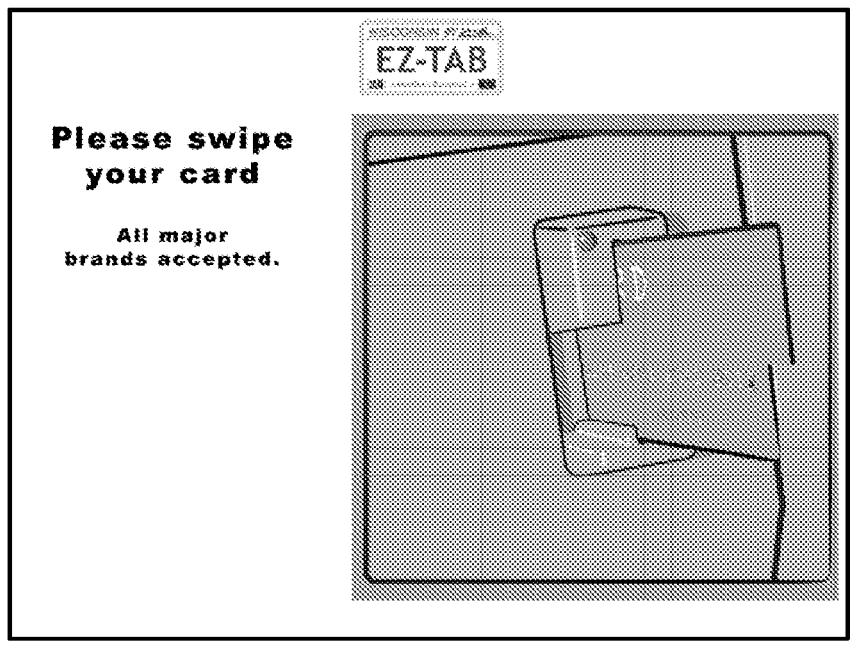
FIG. 14 is a payment submission screen.

The registration dispensing system then prompts the person to provide payment for the registration that is being obtained, as illustrated in FIG. 14. Examples of suitable payments include credit cards, debit cards and gift cards. The registration dispensing system may also include the ability to accept currency and checks for the registration fee.

Figure 15:
FIG. 15 is a second processing screen.

Depending on the amount of time for the registration dispensing system to validate the payment, the registration dispensing system may display a screen indicating that the payment is being processed, as illustrated in FIG. 15. After the payment has been validated, the state registration database is updated to reflect the fact that the registration has been processed.

Figure 16:
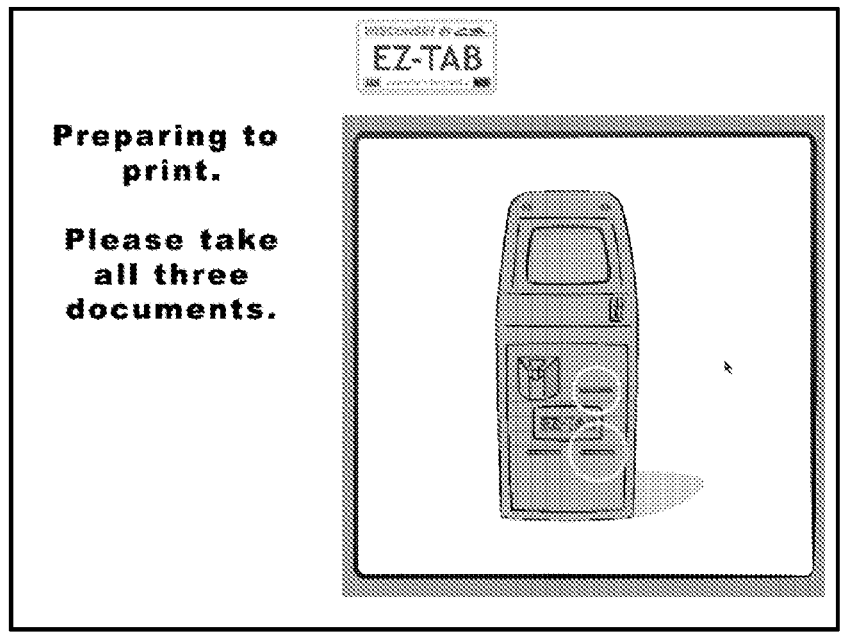
FIG. 16 is a preliminary document dispensing screen.
Figure 17:
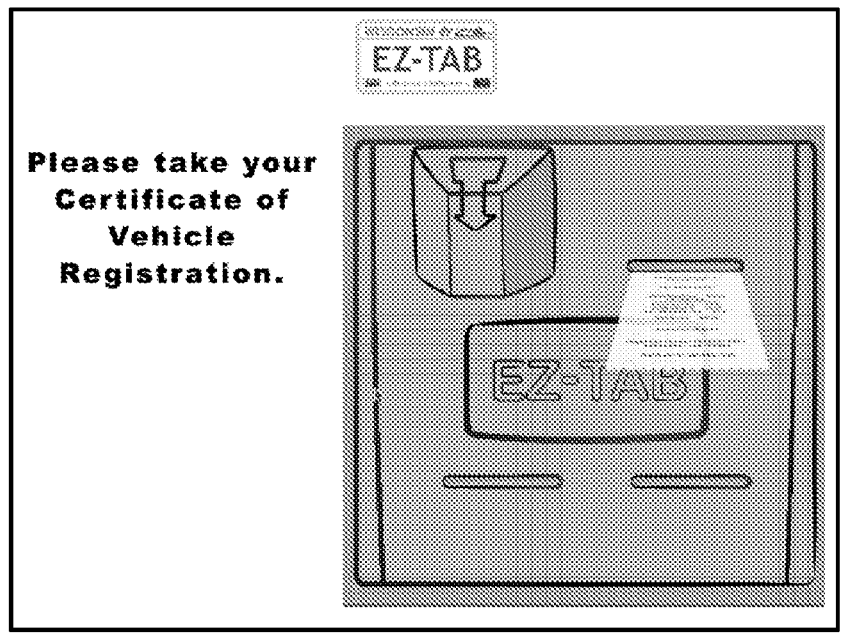
FIG. 17 is a certificate of vehicle registration dispensing screen.
Figure 18:
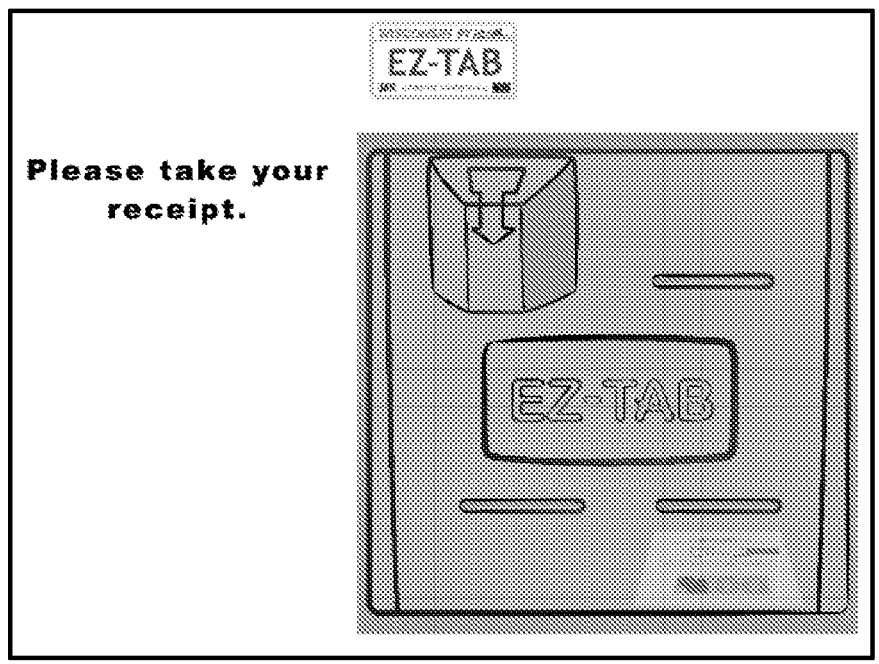
FIG. 18 is a receipt dispensing screen.
Figure 19:
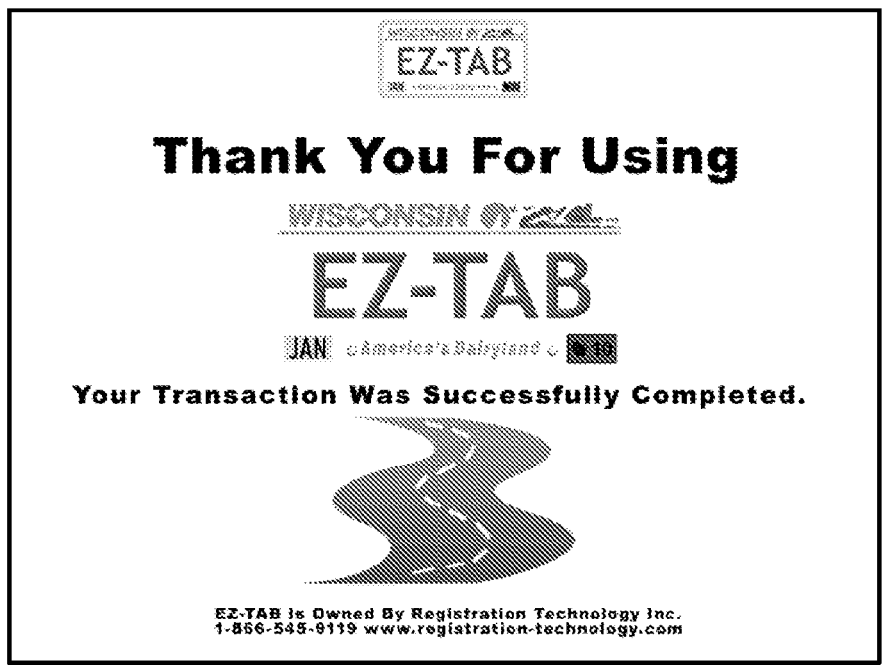
FIG. 19 is a transaction success screen.

The registration dispensing system may display a notice that the registration has been processed and alert the person that the registration documents are being dispensed, as illustrated in FIGS. 16-18. Additionally, the registration dispensing system may provide a separate receipt for the payment. Finally, the registration dispensing system may display a screen to indicate that the registration dispensing process has been completed, as illustrated in FIG. 19.

The registration dispensing system may have a communication link to facilitate transmitting and receiving the data that is needed to process the registration. The communication link may be provided such as using a conventional telephone line. It is also possible for the communication link to be wireless using a variety of protocols such as cellular, Wi-Fi and Bluetooth. To minimize the potential of the data being intercepted while being transmitted through the communication link, the data may be encrypted using at least one layer of encryption.

As an alternative to the person using the registration dispensing system having to pay an additional fee associated with using the registration dispensing system, it is possible for the fee to be paid using other sources. Examples of other sources of paying for the costs associated with the registration dispensing system may be paid through the sale of advertisements. An example of one such advertisement is for insurance that is associated with the type of registration being obtained such as automobile insurance. The registration dispensing system may also dispense coupons or invite the person to complete a survey.

In the preceding detailed description, reference is made to the accompanying drawings, which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments can be positioned in a number of different orientations, the directional terminology is used for purposes of illustration and is in no way limiting. It is to be understood that other embodiments may be utilized and structural or logical changes may be made without departing from the scope of the present invention. The preceding detailed description, therefore, is not to be taken in a limiting sense, and the scope of the present invention is defined by the appended claims.

It is contemplated that features disclosed in this application, as well as those described in the above applications incorporated by reference, can be mixed and matched to suit particular circumstances. Various other modifications and changes will be apparent to those of ordinary skill.

The invention claimed is:

1. A method of dispensing registration comprising:
    entering identifying information in an input module on a registration dispensing system, wherein the identifying information is associated obtaining a registration;
    displaying at least one item on a display module associated with the registration dispensing system for which the registration may be obtained using the registration dispensing system;
    receiving registration payment information for the registration into the input module;
    communicating the identifying information and the registration payment information with a database maintained by or on behalf of an entity issuing the registration;
    receiving registration information from the database;
    formatting the registration information comprising:
        changing an orientation of at least one graphic or at least one textual message,
        changing a size of the at least one graphic or the at least one textual message and
        changing a position of the at least one graphic or the at least one textual message;
    printing the formatted registration information on a registration document with a printing module in the registration dispensing system; and
    dispensing the registration document from the registration dispensing system.

2. The method of claim 1, and further comprising requesting verification information to be entered using the input module.

3. The method of claim 2, wherein the requesting verification information comprises receiving biometric data from a person using the registration dispensing system.

4. The method of claim 1, and further comprising displaying on the display module a message to confirm that the consumer approves payment of the registration charges, wherein the registration comprises a registration fee and a surcharge associated with the use of the registration dispensing system.

5. The method of claim 1, wherein receiving registration payment information comprises accepting payment via cash, check, credit card, debit card, electronic payment or combination thereof.

6. The method of claim 1, and further comprising offsetting at least a portion of the costs associated with developing, installing, operating and maintaining the registration dispensing system using advertisements.

7. The method of claim 1, and further comprising dispensing a receipt that is related to but separate from the registration document.

8. The method of claim 1, wherein the registration is selected from the group consisting of license plates, motor vehicle registrations, driver's licenses, driving records, identification cards, voter registration, marriage license, Amber Alerts, parole check-ins, hunting licenses, fishing licenses, boat registrations, trailer registration, social service registrations, birth certificates, death certificates, health and welfare services, business licenses and changes of address relating to one or more of the preceding registrations.

9. The method of claim 1, and further comprising:
classifying the registration as discretionary or non-discretionary;
charging a first surcharge when dispensing the discretionary registration; and
charging a second surcharge when dispensing the non-discretionary registration, wherein the first surcharge is greater than the second surcharge.

10. A registration dispensing system comprising:
an input module for entering identifying information and registration payment information, wherein the identifying information and the registration payment information are associated obtaining a registration;
a display module for displaying at least item for which the registration may be obtained;
a communications module for communicating the identifying information and the registration payment information with a database maintained by or on behalf of an entity issuing the registration;
a formatting module for formatting registration information received from the database, wherein the formatting module changes:
an orientation of at least one graphic or at least one textual message,
a size of the at least one graphic or the at least one textual message and
a position of the at least one graphic or the at least one textual message; and
a printing module for printing the formatted registration information on a registration document.

11. The registration dispensing system of claim 10, and further comprising a biometric data input device.

12. The registration dispensing system of claim 10, wherein the display module displays a message to confirm that the consumer approves payment of registration charges, wherein the registration charges comprises a registration fee and a surcharge associated with the use of the registration dispensing system.

13. The registration dispensing system of claim 10, wherein the registration payment information comprises cash, check, credit card, debit card, electronic payment or combination thereof.

14. The registration dispensing system of claim 10, wherein the registration is selected from the group consisting of license plates, motor vehicle registrations, driver's licenses, driving records, identification cards, voter registration, marriage license, Amber Alerts, parole check-ins, hunting licenses, fishing licenses, boat registrations, trailer registration, social service registrations, birth certificates, death certificates, health and welfare services, business licenses and changes of address relating to one or more of the preceding registrations.

15. The registration dispensing system of claim 10, wherein the registration dispensing system classifies the registration as discretionary or non-discretionary, charges a first surcharge when dispensing the discretionary registration and charges a second surcharge when dispensing the non-discretionary registration, wherein the first surcharge is greater than the second surcharge.

* * * * *